UNITED STATES PATENT OFFICE.

MORGAN K. ARMSTRONG, OF WINNETKA, ILLINOIS, ASSIGNOR TO BESTWALL MANUFACTURING COMPANY, OF CHICAGO, ILLINOIS, A CORPORATION OF DELAWARE.

PLASTER-BOARD COMPOSITION.

1,301,893.

Specification of Letters Patent. Patented Apr. 29, 1919.

No Drawing. Application filed March 21, 1918. Serial No. 223,721.

*To all whom it may concern:*

Be it known that I, MORGAN K. ARMSTRONG, a citizen of the United States, and a resident of Winnetka, in the county of Cook and State of Illinois, have invented certain new and useful Improvements in Plaster-Board Compositions; and I do hereby declare that the following is a full, clear, and exact description thereof.

This invention relates to improvements in plastic composition and consists of the matters hereinafter described and more particularly pointed out in the appended claims.

The object of the invention is the production of a plastic composition more particularly adapted as a filler for plaster board consisting of covering sheets of paper or other fibrous material and of an intermediate plastic body. The composition, however, is equally useful for other purposes where its peculiar characteristics make its use advantageous.

My improved composition consists of a mixture of dry, ground tan bark, of gypsum or stucco, plaster of Paris or like plastic material.

In preparing the composition, I prefer to use the ingredients in approximately the following proportions:—fifteen pounds of ground tan bark and eighty-five pounds of calcined gypsum, stucco, or other suitable plastic material. The tan bark and gypsum are thoroughly mixed, and to each one hundred pounds of this dry mixture is added about thirty pounds of water. The water, if slightly warmed, will more readily mix with the dry ingredients.

I prefer to mix the dry, ground tan bark and gypsum in a hopper or other mixing device and then discharge this dry mixture in a thin, flat, even layer upon a movable belt. I also prefer to introduce the water into the dry mixture while on the belt, at the same time stirring them together.

Under some weather conditions, when low temperatures prevail, I find it advantageous to add to the dry mixture, a hastener or accelerator such as dextrin or like material, in about the proportion of twenty-five pounds of hastener, to about twelve hundred pounds of the dry mixture of tan bark and gypsum or stucco. The hastener or dextrin is used as an agent to hasten the "setting" of the composition when used for any of its intended purposes.

I have found that ground tan bark is a much better ingredient for use in a plastic composition than, for example, sawdust, which I am aware has been heretofore used. Ground tan bark is a tannery waste of a low fuel value and is only used as a fuel for the purpose of disposing of the same. Again, ground tan bark is more adaptable for this purpose than is ordinary sawdust, because the tan bark includes particles much finer than sawdust. Thus, a larger proportion of tan bark can be used in the composition instead of sawdust, without reducing the resistance against fracture in the finished and set composition as if sawdust had been used. Hence tan bark makes an exceptionally good alternative or substitute for sawdust in a plastic composition.

The small percentage of tannic acid remaining in the ground tan bark, after it has been used in a tannery, acts as an accelerator to the setting or hardening of the finished composition when used for any purpose.

My improved composition is light in weight, is fireproof, is an efficient non-conductor of heat, is impervious to the action of water, after having set and it adheres to the surfaces to which it is applied and possesses all the desirable properties of a plastic composition to be used as a filler for wall board, and for such other purposes as it is desired to use the same.

In describing my invention, I have set forth gypsum or stucco as one of the ingredients, but I use these terms as meaning any dry, pulverized plastic equivalent material, as for instance, plaster Paris.

I claim as my invention:

1. A plastic composition comprising approximately eighty-five pounds of calcined gypsum, mixed dry with approximately fifteen pounds of ground tan bark, the combined one hundred pounds of dry mixture being again mixed with substantially thirty pounds of water.

2. A plastic composition comprising approximately eighty-five pounds of calcined gypsum, approximately fifteen pounds of ground tan bark, and approximately two pounds of hastener, mixed dry, the combined dry mixture having added to it about thirty pounds of water for approximately each one hundred pounds of dry mixture.

In testimony that I claim the foregoing as my invention, I affix my signature in the presence of two witnesses, this 13th day of March, A. D. 1918.

MORGAN K. ARMSTRONG.

Witnesses:
T. H. ALFREDS,
D. DARRENOUGUE.